(12) United States Patent
Krishnamurthy et al.

(10) Patent No.: US 8,874,638 B2
(45) Date of Patent: Oct. 28, 2014

(54) INTERACTIVE ANALYTICS PROCESSING (75) Inventors: Rajaram B. Krishnamurthy, Wappingers Falls, NY (US); Carl J. Parris, Rhinebeck, NY (US); Charles Boice, Endicott, NY (US); Lurng-Kuo Liu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/637,962

(22) Filed: Dec. 15, 2009

(65) Prior Publication Data
US 2011/0145318 A1 Jun. 16, 2011

(51) Int. Cl.
*G06F 15/16* (2006.01)
*G06F 9/50* (2006.01)

(52) U.S. Cl.
CPC ................................ *G06F 9/5027* (2013.01)
USPC ........................................................ 709/203

(58) Field of Classification Search
CPC ..................................................... G09F 9/5027
USPC ........................................................ 709/203
See application file for complete search history.

(56) References Cited

U.S. PATENT DOCUMENTS

| | | | |
|---|---|---|---|
| 4,636,947 A | 1/1987 | Ward | |
| 5,526,409 A | 6/1996 | Conrow et al. | |
| 5,533,204 A | 7/1996 | Tipley | |
| 6,407,680 B1 | 6/2002 | Lai et al. | |
| 6,647,381 B1 | 11/2003 | Li et al. | |
| 6,704,861 B1 | 3/2004 | McKeen et al. | |
| 6,813,251 B1 | 11/2004 | Garney et al. | |
| 7,096,003 B2 | 8/2006 | Joao et al. | |
| 7,159,233 B2 | 1/2007 | Son et al. | |
| 7,296,263 B1 | 11/2007 | Jacob | |
| 7,353,299 B2 | 4/2008 | Hattrup et al. | |
| 7,478,400 B1 | 1/2009 | Banerjee et al. | |
| 7,505,686 B2 | 3/2009 | Jennen | |
| 7,574,405 B2 | 8/2009 | Rallo et al. | |
| 7,609,652 B2 | 10/2009 | Kellerer et al. | |
| 7,681,015 B2 | 3/2010 | Busck et al. | |
| 7,743,161 B2 | 6/2010 | Dey et al. | |

(Continued)

FOREIGN PATENT DOCUMENTS

| | | |
|---|---|---|
| CN | 1232086 C | 12/2005 |
| CN | 101308468 A | 11/2008 |

(Continued)

OTHER PUBLICATIONS z/Architecture Principles of Operation, IBM Publication No. SA22-7832-07, Feb. 2009.

(Continued)

*Primary Examiner* — Maceeh Anwari
(74) *Attorney, Agent, or Firm* — Steven Chiu, Esq.; Blanche E. Schiller, Esq.; Heslin Rothenberg Farley & Mesiti P.C.

(57) ABSTRACT

An end-to-end record, request, response token-based protocol is used to facilitate processing of client jobs. This allows the client to forward analytical tasks of a job directly to an analytics cluster and to record an indication of such at a server. The accelerators of the cluster to perform the tasks are specified in a token provided by the server to the client.

20 Claims, 8 Drawing Sheets

(56) References Cited

U.S. PATENT DOCUMENTS

| | | |
|---|---|---|
| 7,797,720 B2 | 9/2010 | Gopalakrishnan et al. |
| 8,108,234 B2 | 1/2012 | Suenbuel et al. |
| 8,170,928 B2 | 5/2012 | Knowles et al. |
| 8,209,375 B2 | 6/2012 | Gormish et al. |
| 2001/0056445 A1 | 12/2001 | Meystel et al. |
| 2002/0138376 A1 | 9/2002 | Hinkle |
| 2003/0191805 A1 | 10/2003 | Seymour et al. |
| 2003/0195940 A1 | 10/2003 | Basu et al. |
| 2004/0039691 A1 | 2/2004 | Barratt et al. |
| 2004/0205199 A1 | 10/2004 | Gormish |
| 2004/0243643 A1 | 12/2004 | Hattrup et al. |
| 2005/0021806 A1 | 1/2005 | Richardson et al. |
| 2005/0209957 A1 | 9/2005 | Kasiviswanathan et al. |
| 2006/0090009 A1 | 4/2006 | Gopalakrishnan et al. |
| 2006/0123467 A1* | 6/2006 | Kumar et al. ............ 726/3 |
| 2006/0259627 A1 | 11/2006 | Kellerer et al. |
| 2006/0294239 A1 | 12/2006 | Ishida |
| 2007/0180496 A1 | 8/2007 | Fransdonk |
| 2008/0082647 A1 | 4/2008 | Baker |
| 2008/0086570 A1 | 4/2008 | Dey et al. |
| 2008/0133741 A1 | 6/2008 | Kubota |
| 2008/0162881 A1 | 7/2008 | Welc et al. |
| 2008/0184011 A1 | 7/2008 | Busck et al. |
| 2009/0028142 A1 | 1/2009 | Schmidt et al. |
| 2009/0055473 A1 | 2/2009 | Synnergren |
| 2009/0217266 A1* | 8/2009 | Krishnamurthy et al. .... 718/100 |
| 2009/0262749 A1 | 10/2009 | Graumann et al. |
| 2009/0271262 A1 | 10/2009 | Hammad |
| 2010/0281142 A1 | 11/2010 | Stoyanov et al. |
| 2011/0126275 A1* | 5/2011 | Anderson et al. ............ 726/8 |
| 2011/0137795 A1 | 6/2011 | Nambiar et al. |
| 2011/0145366 A1 | 6/2011 | Krishnamurthy et al. |
| 2011/0145429 A1 | 6/2011 | Krishnamurthy et al. |
| 2012/0278384 A1 | 11/2012 | Synnergren et al. |

FOREIGN PATENT DOCUMENTS

| | | |
|---|---|---|
| JP | 2000353066 A | 12/2000 |
| JP | 2005505214 A | 2/2005 |
| JP | 2006146951 A | 6/2006 |
| JP | 2008197783 A | 8/2008 |
| WO | WO2008092883 A | 8/2008 |

OTHER PUBLICATIONS

Reddy, P. and Kitsuregawa M., "Speculative Transaction Processing Approach for Database Systems," IEIC Technical Report, vol. 98, No. 487, pp. 11-18. (Abstract Only).

Office Action for U.S. Appl. No. 12/637,972 dated May 12, 2011.

Final Office Action for U.S. Serial No. 12,637,972 dated Aug. 31, 2011.

International Search Report and Written Opinion for PCT/EP2010/068205 dated Mar. 18, 2011.

Redlich, J.P. et al., "Virtual Networks in the Internet," Open Architectures and Network Programming Proceedings, Mar. 1999, pp. 108-114.

Office Action for U.S. Appl. No. 12/637,951 dated Feb. 4, 2013.

Final Office Action for U.S. Appl. No. 12/637,951 dated Aug. 28, 2013, pp. 1-12.

Office Action for U.S. Appl. No. 12/637,972 dated Nov. 13, 2013, pp. 1-19.

Final Office Action for U.S. Appl. No. 12/637,972 dated Aug. 31, 2011, pp. 1-10.

International Search Report and Written Opinion for PCT/EP2010/068205 dated Mar. 18, 2011, pp. 1-11.

"z/Architecture Principles of Operation," IBM Publication No. SA22-7832-07, Feb. 2009, pp. 1-1344.

Reddy, P. and Kitsuregawa M., "Speculative Transaction Processing Approach for Database Systems," IEIC Technical Report, vol. 98, No. 487, pp. 11-18, 1998 (no further date information available) (Abstract Only).

Office Action for U.S. Appl. No. 12/637,972 dated May 12, 2011, pp. 1-12.

Office Action for U.S. Appl. No. 12/637,972 dated Mar. 23, 2014, pp. 1-8.

* cited by examiner

INTERACTIVE ANALYTICS PROCESSING

BACKGROUND

This invention relates, in general, to facilitating processing within a computing environment, and in particular, to facilitating analytics processing within the computing environment.

Currently, there are computing environments in which clients, even thousands of clients, are attached to a single server, and that server is attached to one or more accelerators. The accelerators are used to increase the processing capabilities of the server. In particular, the accelerators are optimized to perform certain analytics at higher speeds than if that processing was performed by the server.

Specifically, the server receives a job from a client, and that job includes one or more tasks requiring analytics processing. The server sends the tasks to the accelerators, which perform the processing, and then forward the results to the server. The server then communicates the results to the client.

In such environments, jobs from all the clients coupled to the server are routed through the server. The server is responsible for receiving the jobs, forwarding the specific tasks to the accelerators, receiving the results from the accelerators, and communicating those results to the clients.

BRIEF SUMMARY

To improve efficiency of this type of processing, in accordance with an aspect of the present invention, the client bypasses the main central processing unit (CPU) of the server in sending the tasks to the accelerators. Instead, the client forwards the tasks directly to the accelerators. This direct forwarding is, for instance, via a switch between the client and the accelerators or via a protocol tunnel through the server, which does not use the main processor of the server. By sending the tasks directly to the accelerators, a potential bottle-neck at the server is avoided. The server, however, is kept informed of the requested processing and has a part in managing that processing.

The shortcomings of the prior art are overcome and additional advantages are provided through the provision of a computer program product for facilitating processing of jobs in a computing environment. The computer program product comprises a storage medium readable by a processing circuit and storing instructions for execution by the processing circuit for performing a method. The method includes, for instance, determining, by a client processor, whether a compute token obtained by the client processor specifies a computing unit to be used by the client processor; in response to determining that the compute token specifies the computing unit, forwarding by the client processor at least a portion of a job to the computing unit to perform analytics processing for the job; and providing, by the client processor to a processor coupled to the client processor, an indication that analytics processing for the job has been requested by the client processor.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, processing of client jobs is facilitated in hybrid computing environments, as well as other environments. In one example of a hybrid computing environment, one or more clients are coupled to a server and one or more accelerators, which process jobs initiated by the clients. This processing is managed using a record, request and response protocol, as well as compute tokens, as described herein.

As one example, a client obtains from the server a compute token designating the one or more accelerators the client can use for a particular job (such as, for instance, compute intensive calculations required by a spreadsheet). The client sends one or more tasks of the job directly to the one or more accelerators, which perform analytics processing for those tasks. Additionally, the client records the job submission at the server enabling the server to perform cleanup or recovery, if the client terminates prematurely. The server responds to this record received from the client.

Figure 1:
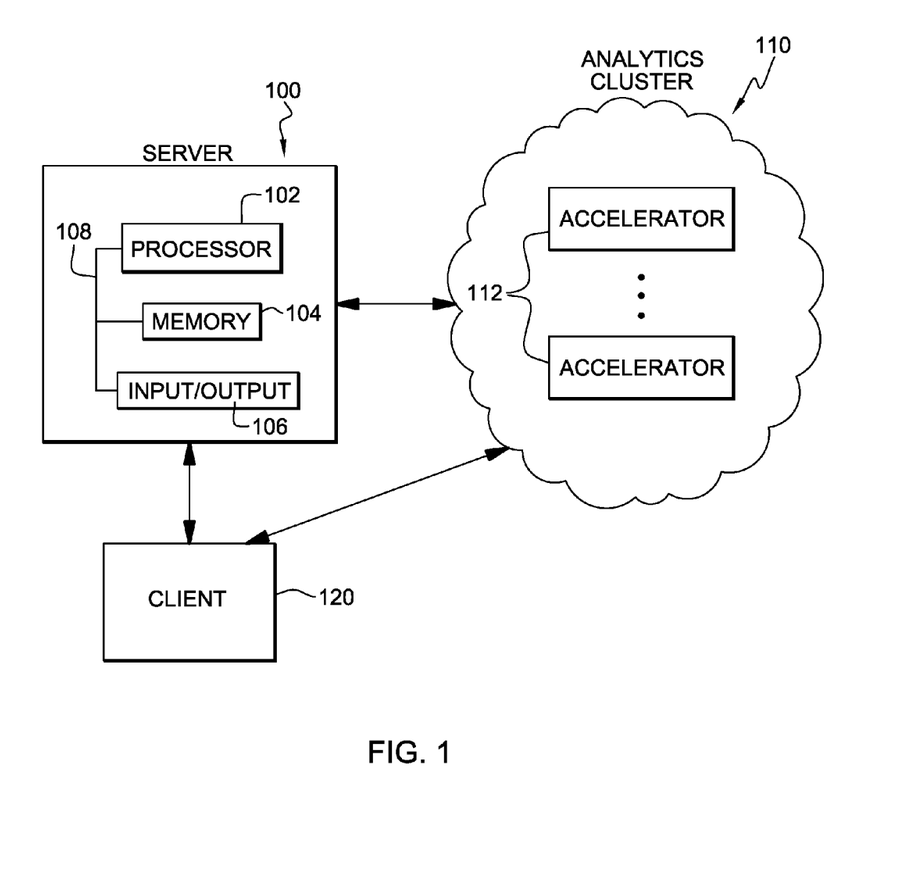
FIG. 1 depicts one example of a computing environment to incorporate and use one or more aspects of the present invention.

One embodiment of a computing environment to incorporate and use one or more aspects of the present invention is depicted in FIG. 1. In this example, a server 100 is coupled to an analytics cluster 110. Server 100 includes, for instance, one or more processors 102, memory 104, and one or more input/output (I/O) devices or interfaces 106 coupled to one another via one or more buses 108. As examples, server 100 is a SYSTEM P®, SYSTEM X® or SYSTEM Z® server offered by International Business Machines Corporation (IBM®), Armonk, N.Y. IBM®, SYSTEM P®, SYSTEM X® and SYSTEM Z® are registered trademarks of International Business Machines Corporation, Armonk, N.Y. Other names used herein may be registered trademarks, trademarks or product names of International Business Machines Corporation or other companies.

In another embodiment, the server includes one or more partitions or zones. For example, the server is a logically partitioned SYSTEM Z® server based on the Z/ARCHITECTURE® offered by International Business Machines Corporation, Armonk, N.Y. The Z/ARCHITECTURE® is described in an IBM® publication entitled, "z/Architecture Principles of Operation," IBM Publication No. SA22-7832-07, February 2009, which is hereby incorporated herein by reference in its entirety. Z/ARCHITECTURE® is a registered trademark of International Business Machines Corporation, Armonk, N.Y.

In one example, analytics cluster 110 includes one or more computing units to perform analytics processing. The computing units in this example are hardware accelerators 112, such as blades in a blade center or chassis. Example accelerators include IBM® Cell BE blades; IBM® Datapower units; nVidia GPUs; and/or SYSTEM P® or SYSTEM X® blades, offered by International Business Machines Corporation. In a further example, the computing units are servers, such as SYSTEM X®, SYSTEM P® or SYSTEM Z® servers. Many other examples are also possible. The cluster may include a mix of different computing units, including a mix of different accelerator types.

In one example, server 100 communicates with analytics cluster 110 via, for instance, a network, such as PCI Express, InfiniBand, Ethernet, etc. Further, server 100 and analytics cluster 110 are coupled to at least one client 120 via, for instance, one or more switches offered by Cisco Systems, Inc. or International Business Machines Corporation, as examples. Client 120 may be a server, such as a SYSTEM X®, SYSTEM P® or SYSTEM Z® server, a workstation attached to a mainframe server, or other type of computing unit.

In accordance with an aspect of the present invention, in order to facilitate the end-to-end token-based processing protocol described herein, a number of data structures (e.g., tables) are used to maintain various information. These data structures include, for instance, a server job table, a mapping table and a client job table, each of which is described below.

Figure 2A:
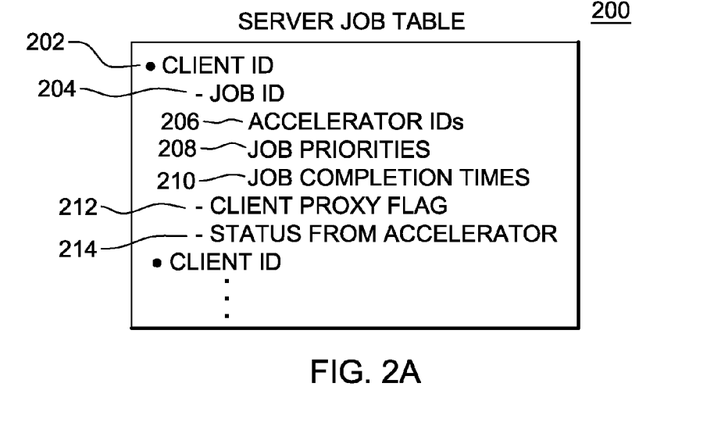
FIG. 2A depicts one example of a server job table used in accordance with an aspect of the present invention.

In one example, the server job table is maintained by the server and includes a list of jobs for each client, as well as other information. One example of a server job table is described with reference to FIG. 2A. A server job table 200 includes, for instance, one or more client identifiers 202 (e.g., IP address or arbitrary unique value) identifying clients that have informed the server of submitted jobs or submitted requests to perform jobs. Associated with each client is a linked list of job ids 204 identifying jobs submitted by that client, and for each job id there is an indication of one or more requested accelerators 206 for the job; a linked list of job priorities 208 in which a priority is specified by the client for each job in the linked list of jobs; and a linked list of job completion times 210, which specifies a required completion time (a.k.a., deadline) for the job. Additionally, associated with the client id is a client proxy flag 212 indicating whether the server can manage the job on behalf of the client, and a status field 214 that includes status provided from the accelerator executing the job.

Figure 2B:
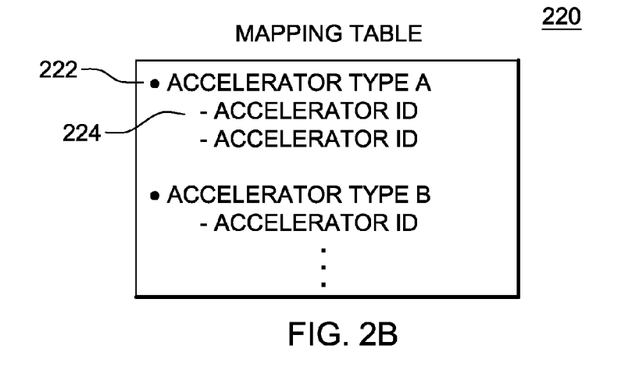
FIG. 2B depicts one example of a mapping table used in accordance with an aspect of the present invention.

In addition to the server job table, the server also maintains a mapping table, an example of which is depicted in FIG. 2B. The mapping table maps accelerator types with accelerators. For instance, mapping table 220 includes one or more accelerator types 222 (e.g., Cell BE Blades, nVidia GPU, etc.), and for each accelerator type, there is a list of accelerator identifiers 224 that are of that type.

Figure 2C:
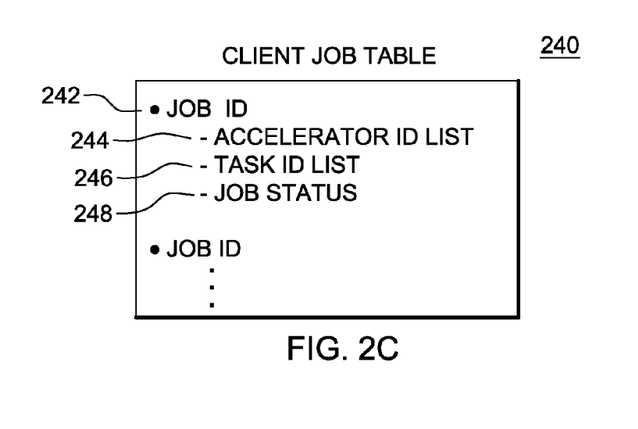
FIG. 2C depicts one embodiment of a client job table used in accordance with an aspect of the present invention.

Further, a client job table is maintained by the client. As depicted in FIG. 2C, in one example, a client job table 240 includes one or more jobs 242 that have been submitted. For each job, there is an indication of a list of one or more accelerators 244 usable by the job; a list of task identifiers 246 identifying the one or more tasks of the job; and job status 248 that indicates the status of the job.

Figure 3A:
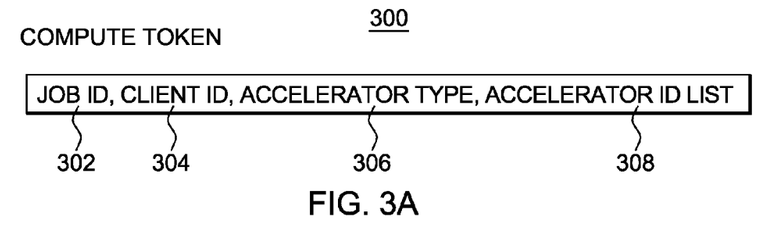
FIG. 3A depicts one example of a compute token used in accordance with an aspect of the present invention.

In addition to the above data structures, processing is facilitated by the use of compute tokens (a.k.a., accelerator credits). A compute token is a credit that can be used by a client to access an accelerator for a particular job. One example of a compute token is depicted in FIG. 3A. A compute token 300 includes, for instance, a job identifier 302 specifying the job for which this compute token is assigned; a client identifier 304 identifying the client being provided the compute token; an accelerator type 306 specifying the type of accelerator to be used for the job specified by job id; and an accelerator id list 308 specifying the particular accelerators that can be used for this job. If this field is null, then no accelerators are available for this job at this time. The compute token is for the particular accelerator type and the specific list of accelerator ids, if indicated. There may be a separate token queue in the client for each type of accelerator.

In response to receiving a compute token for the job, the client submits the job, if an accelerator is specified; or waits to submit the job, until it receives an indication of an available accelerator. In either case, the client records the job submission/request for submission with the server using, for instance, a record request packet, an example of which is described with reference to FIG. 3B.

Figure 3B:
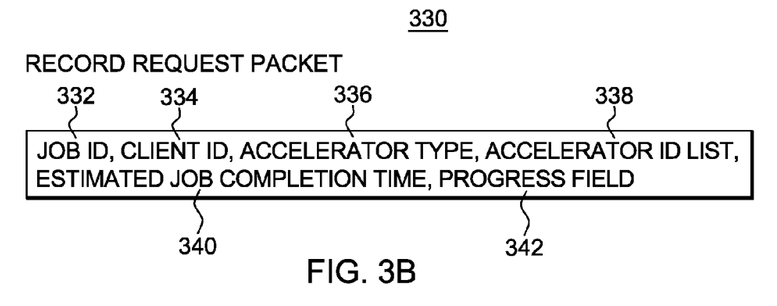
FIG. 3B depicts one example of a record request packet used in accordance with an aspect of the present invention.

In one example, a record request packet 330 includes the following fields:
Job ID 332: Identifying the job submitted or requested to be submitted;
Client ID 334: Identifying the client that submitted the job or request for submission;
Accelerator Type 336: Indicating the type of accelerator in which the job is to run;
Accelerator ID List 338: Indicating the one or more accelerators of the accelerator type in which the job can run;
Estimated Job Completion Time 340: An estimated time of when the job is to be complete; and
Progress Field 342: Providing status regarding the job.

Figure 3C:
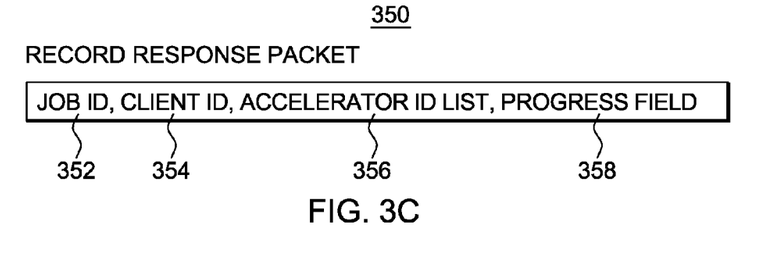
FIG. 3C depicts one embodiment of a record response packet used in accordance with an aspect of the present invention.

The server receives the record request packet, and responds thereto. As one example, the server prepares a record response packet 350, an example of which is depicted in FIG. 3C. A record response packet 350 includes, for instance, a job identifier 352 identifying the job; a client identifier 354 identifying the client; an accelerator id list 356 identifying accelerators, if specified, that can be used by the specified client to process the indicated job; and a progress field 358 specifying status of the job.

Each client can dispatch a number of jobs. The client dispatches each job to the accelerator cluster, based on tokens provided by the server, and informs the server of the dispatch or of a request to dispatch. One embodiment of this processing is described with reference to FIGS. 4A-4C.

Figure 4A:
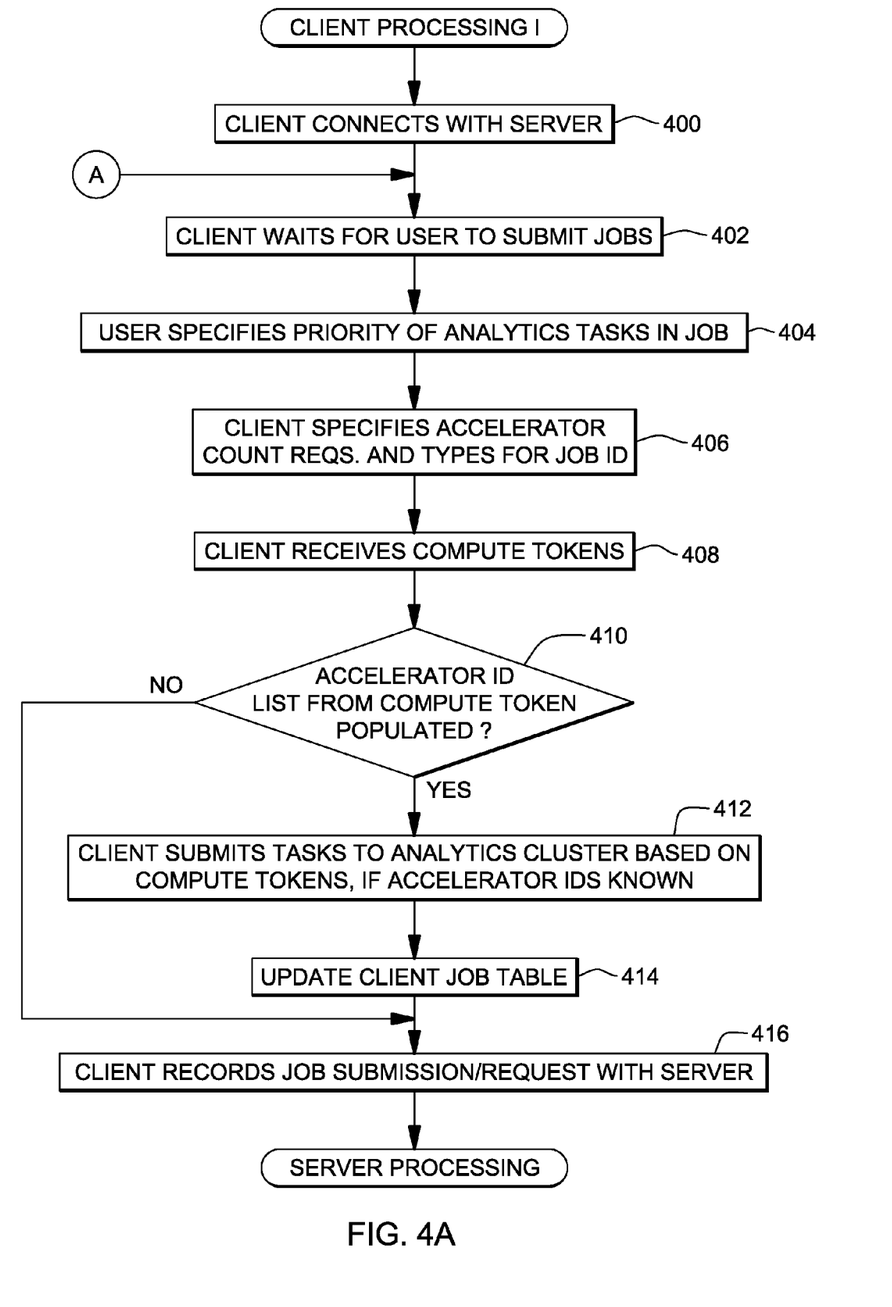
FIGS. 4A-4C depict one embodiment of the logic to process a client job, in accordance with an aspect of the present invention.

Referring initially to FIG. 4A, a client connects with the server, STEP 400, and waits for a user to submit a job, STEP 402. The user submits a job, identifies analytic tasks within the job and provides a high, medium or low priority for each of the analytic tasks, STEP 404. In response to receiving the job and the priorities, the client specifies the desired requirements for accelerators for the job, STEP 406. For example, the client specifies based on, for instance, rules or an indication from the user, the accelerator type to be used, and one or more of a minimum number of accelerators needed/desired, a maximum number of accelerators needed/desired, and an average number of accelerators needed/desired.

In response to providing this information to the server, the server provides the client with a compute token to be used for analytics processing for the job, STEP 408. The compute token grants permission to the client to submit a request (e.g., a job or task) on a particular accelerator, if the compute token designates an accelerator id. If no accelerator id is specified, then permission is delayed. For example, the server uses server job table 200 to determine available accelerator ids to dispatch jobs. The server may also query the accelerator cluster directly for available accelerators. In one example, the job id assigned by the client is stored in the analytics cluster. This allows the server to use the job id assigned by the client to check for progress of any jobs in the analytics cluster directly.

In response to receiving the compute token from the server, the client determines if the accelerator id list within the token is populated, INQUIRY 410. If the accelerator id list is populated with at least one accelerator identifier, then the client submits one or more tasks of that job to the at least one accelerator identified in the compute token, STEP 412. The client submits these tasks directly (i.e., without use of the main CPU of the server). Additionally, the client updates the status field of this job identifier in the client job table to reflect submitted, STEP 414. Thereafter, the client records the job submission with the server, STEP 416. In one example, the client sends a record request packet to the server that includes the job id; the client id; the accelerator type from the compute token; the accelerator id list from the compute token; estimated job completion time, and the progress field, which in this case would be indicated as submitted.

Returning to INQUIRY 410, if the accelerator id list is not populated in the compute token provided for this job id, then the client records the job submission request with the server, STEP 416. Again, this recordation is via a record request packet. However, in this case, the progress field is set to requested, as opposed to submitted and the accelerator id list is null.

Figure 4B:
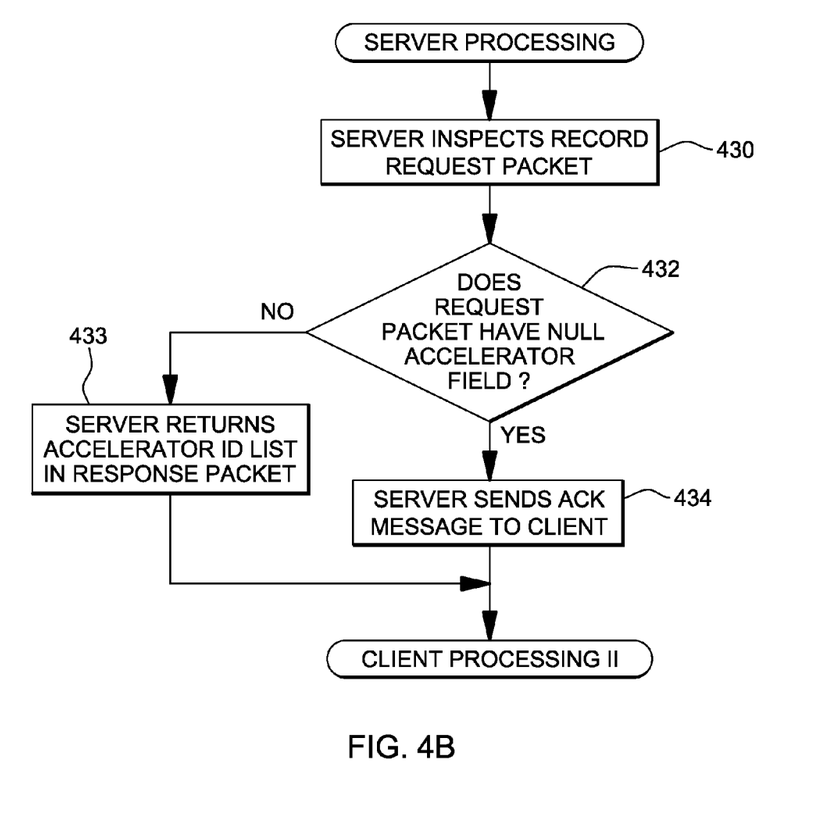

In response to receiving the record request packet, the server inspects that packet, STEP 430 (FIG. 4B). A determination is made as to whether the record request packet has a null accelerator id field, INQUIRY 432. If it does have a null accelerator field, then the server sends an acknowledgment message to the client possibly providing one or more accelerator identifiers, STEP 434. In one example, this acknowledgment is the record response packet, which includes the job identifier, the client identifier, an accelerator id list with zero or more designated accelerators, and a progress field still specifying requested. The server uses the accelerator type field of the request packet, the server job table and the mapping table to identify accelerators to be used for the job, if any.

Returning to INQUIRY 432, if the request packet includes a list of one or more accelerator identifiers, then the server copies that accelerator id list to the response packet, which is returned to the client, STEP 433.

Figure 4C:
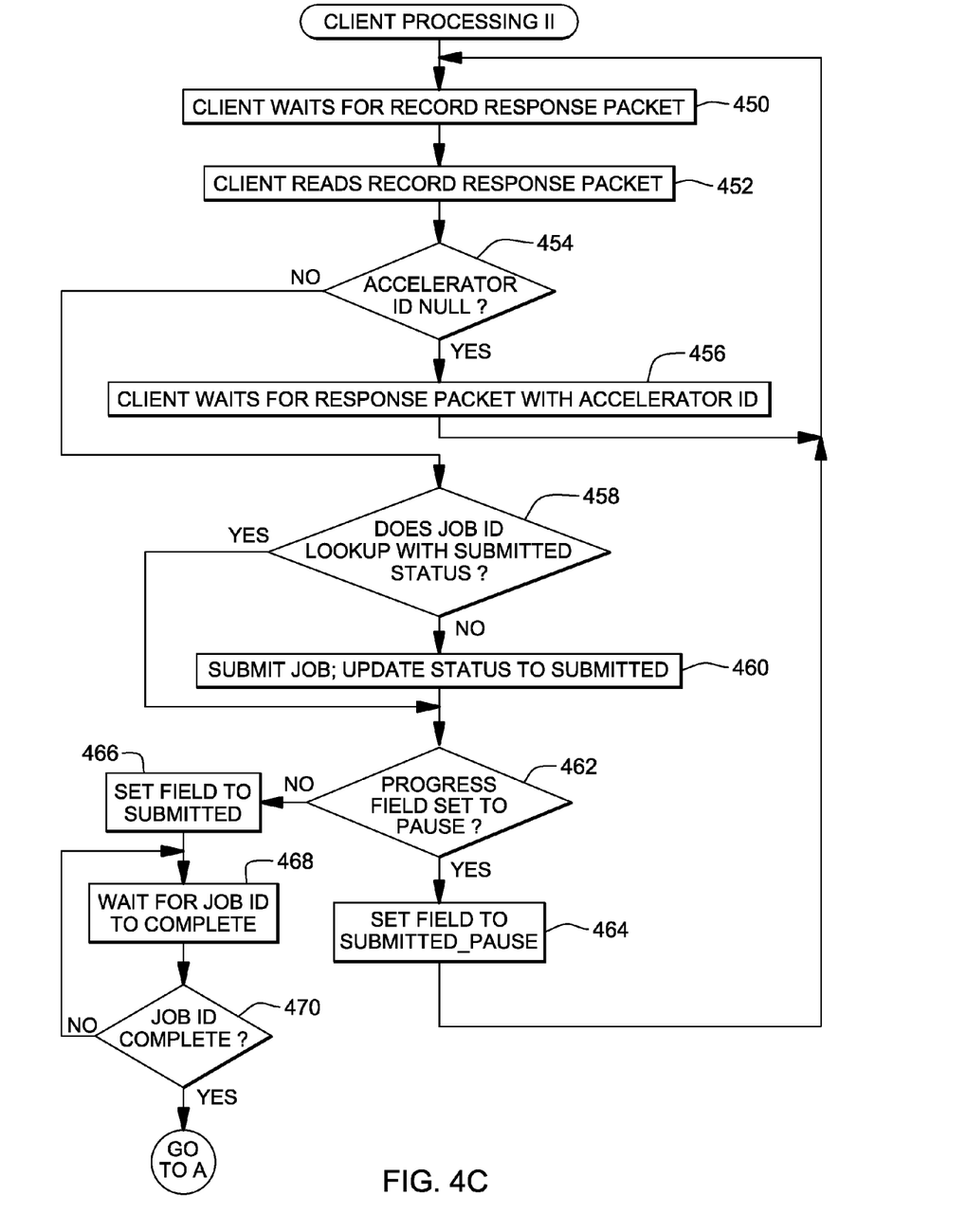

The client waits for the record response packet, STEP 450 (FIG. 4C). In response to receiving the record response packet, the client reads the packet, STEP 452, and determines whether the accelerator id list is null, INQUIRY 454. If the accelerator identifier list is null, then the client waits for a response packet with an accelerator id, STEP 456. Processing continues at STEP 450. The client can still process other job ids, however.

Returning to INQUIRY 454, if the accelerator id is not null, then a determination is made as to whether the job id in the record response packet has a status of submitted in the client job table, INQUIRY 458. If not, the job is submitted by the client and the status in the job table is updated to submitted, STEP 460. Thereafter, or if the job does have a status of submitted, a determination is made as to whether the progress field from the record response packet is set to pause for the job id, INQUIRY 462. The pause in the progress field is used by the server to allow accelerator ids to be used for higher priority jobs. Also accelerators in the cluster may update the server directly with pause status if they malfunction or become unavailable. This is useful in the case that clients are unreachable from the cluster. If it is set to pause, then the status field corresponding to the job id in the client job table is set to submitted-pause, STEP 464. Processing continues with STEP 450.

Returning to INQUIRY 462, if the progress field is not set to pause, then the status field corresponding to job id in the client job table is set to submitted, STEP 466. Processing continues with waiting for the job id to complete at the analytics cluster, STEP 468. A determination is made as to whether the job has completed, INQUIRY 470. If not, processing continues at STEP 468. Otherwise, processing continues at STEP 402, in which the client waits for the user to submit jobs.

Typically, clients are less reliable than servers, and can terminate prematurely (i.e., prior to completion of its jobs). Therefore, in accordance with an aspect of the present invention, a protocol is used to allow the accelerators to be released back to the server, if the client has terminated unexpectedly. In one example, the client sets a proxy flag in a keep_alive message, which also has a reconnect field. This allows the server to manage the job on behalf of the client, and allows the client to disconnect and reconnect at will.

Figure 5:
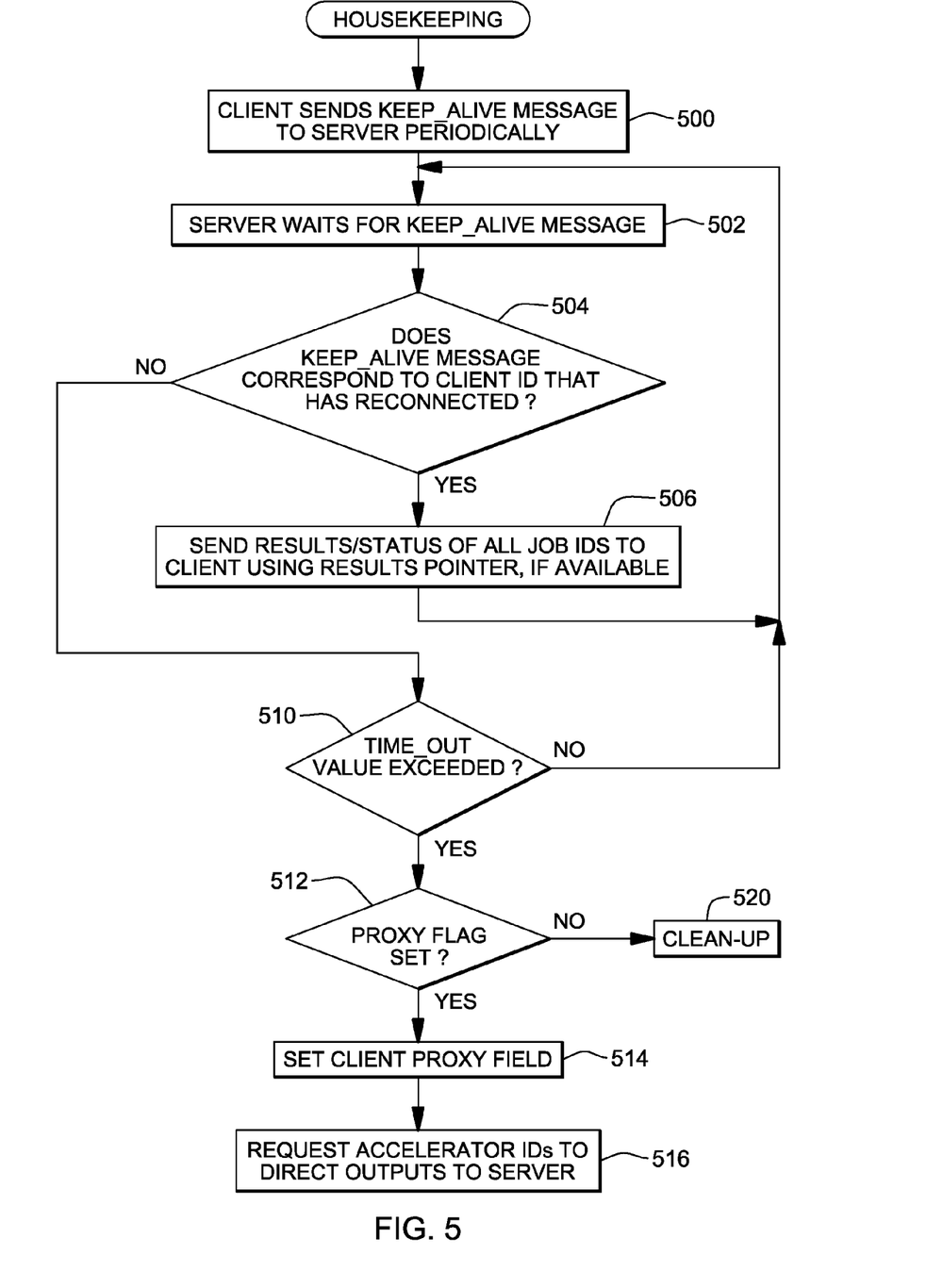
FIG. 5 depicts one embodiment of the logic to perform cleanup associated with job processing, in accordance with an aspect of the present invention.

One embodiment of the logic to perform this housekeeping is described with reference to FIG. 5. Initially, the client sends a keep_alive message to the server periodically, STEP 500. This period is chosen by the designer of the system, as one example. The server waits for a keep_alive message, STEP 502. In response to receiving a keep_alive message, a determination is made by the server as to whether the keep_alive message corresponds to a client id that has reconnected, as indicated in the reconnect field of the keep-alive message, INQUIRY 504. If the client has reconnected, then results/status of all job ids of the client are sent to the client using a results pointer, if available, STEP 506. In one example, the results pointer is the address of a location in storage where the server has buffered the client's results on behalf of the client. Processing then continues at STEP 502.

Returning to INQUIRY 504, if the keep_alive message does not correspond to a client id that has reconnected, a determination is made as to whether a timeout value has been exceeded, INQUIRY 510. If it has not been exceeded, then processing continues with STEP 502. However, if it has been exceeded, then a determination is made as to whether the proxy flag is set from the previous keep-alive message, INQUIRY 512. If the proxy flag is set, then the client proxy field is set in the server job table for this job id, STEP 514, and a request is sent to the accelerators to direct all outputs for this client id to the server, STEP 516. The accelerators send the status/results to the server, instead of the client.

Returning to INQUIRY 512, if the proxy flag is not set, then cleanup is performed, STEP 520. In one example, this includes cleaning server job ids corresponding to the client id from the server job table, and cleaning accelerators of the job ids, jobs, tasks and corresponding data. This concludes the housekeeping processing.

Described in detail above is a capability for a client to use an end-to-end record, request, response token-based protocol to facilitate processing of client jobs. This allows the client to forward analytical tasks of a job directly to the analytics cluster and to record an indication of such at the server. This may be performed serially or substantially concurrently. This eliminates the need for the server, in particular, the server's CPU, to have to forward all of the requests to the analytics cluster and handle return results and data. It improves scalability for interactive analytics processing, while maintaining control by the server. It avoids a two-phase protocol consisting of communication from the client to the server, and subsequent forwarding of information from the server to the analytics cluster.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
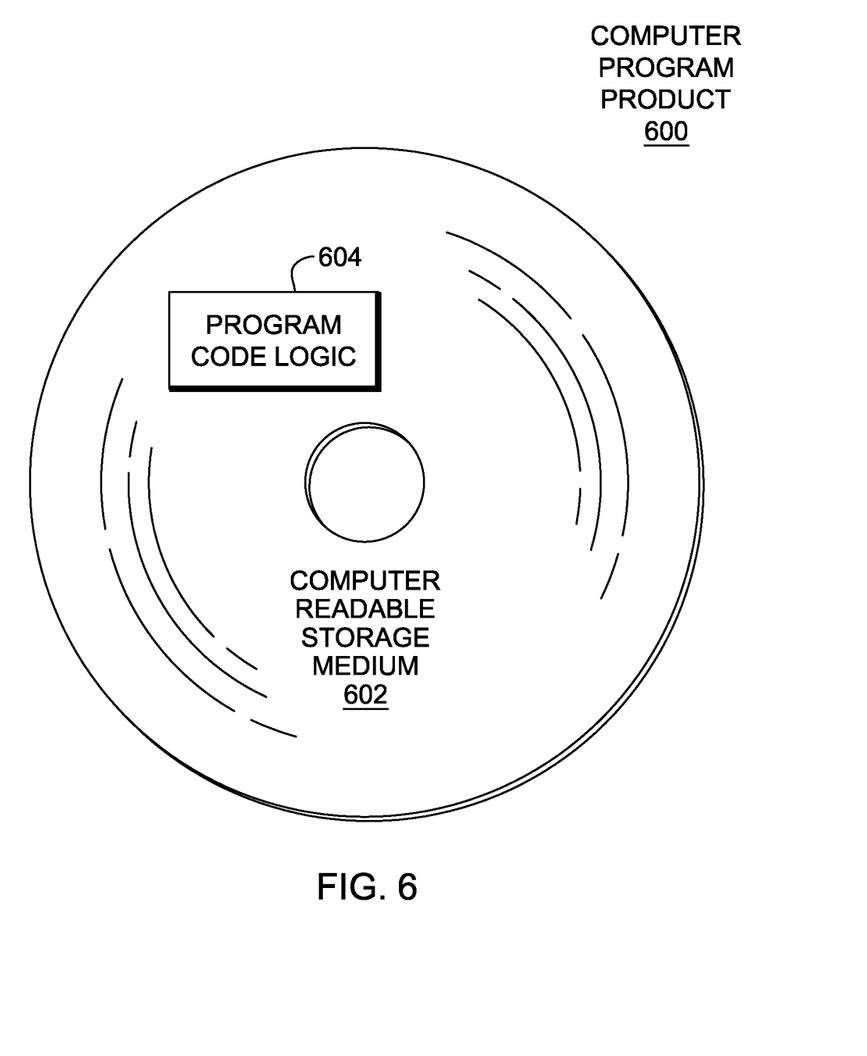
FIG. 6 depicts one embodiment of a computer program product incorporating one or more aspects of the present invention.

Referring now to FIG. 6, in one example, a computer program product 600 includes, for instance, one or more computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention, and/or different types of servers, accelerators or other computing units, and/or clients may be used. Additionally, the information provided in the various data structures and/or packets may be different than provided herein. Further, other housekeeping details may be provided. Many other revisions may be made without departing from the spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing of jobs in a computing environment, the computer program product comprising:

a non-transitory storage medium readable by a processing circuit and storing instructions for execution by the processing circuit for performing a method comprising:

determining, by a client processor, whether a compute token obtained by the client processor specifies a computing unit to be used by the client processor to submit a job, the compute token obtained by the client processor from a server processor coupled to the client processor and distinct from the computing unit, and the determining comprising checking an identifier field of the compute token to determine whether the computing unit is included in the identifier field;
based on determining that the compute token specifies the computing unit, forwarding by the client processor at least a portion of the job to the computing unit to perform analytics processing for the job; and
providing, by the client processor to the server processor, an indication that analytics processing for the job has been requested by the client processor.

2. The computer program product of claim 1, wherein the forwarding and providing are performed concurrently.

3. The computer program product of claim 1, wherein the method further comprises notifying the server processor of a request to use a computing unit for analytics processing, based on determining that the compute token does not specify the computing unit.

4. The computer program product of claim 3, wherein the method further comprises:
obtaining by the client processor an identification of the computing unit to use, based on the notifying; and
submitting the at least a portion of the job to the computing unit corresponding to the identification.

5. The computer program product of claim 1, wherein the providing comprises sending a record request packet to the server processor, the record request packet comprising at least one of an identifier of the job, an identifier of the client processor, a type of the computing unit, an identifier of the computing unit, an estimated completion time for the job, and a progress field.

6. The computer program product of claim 1, wherein the method further comprises responding by the server processor to the client processor, based on receiving the indication.

7. The computer program product of claim 6, wherein the responding comprises sending a record response packet to the client processor, the record response packet comprising at least one of an identifier of the job, an identifier of the client processor, an identifier of the computing unit, and a progress field.

8. The computer program product of claim 1, wherein the computing unit comprises an accelerator.

9. The computer program product of claim 1, wherein the method further comprises:
determining by the server processor that the client processor has terminated prior to completion of one or more jobs of the client processor;
checking a proxy indicator; and
directing output of the one or more jobs to the server processor, based on determining the client processor has terminated prior to completion and based on the proxy indicator having a first defined value.

10. The computer program product of claim 9, wherein the method further comprises performing cleanup on the computing unit of the one or more jobs, based on determining the client processor has terminated prior to completion and based on the proxy indicator having a second defined value.

11. A computer system for facilitating processing of jobs in a computing environment, the computer system comprising:
a memory; and
a processor in communications with the memory, wherein the computer system is configured to perform a method, said method comprising:
determining, by a client processor, whether a compute token obtained by the client processor specifies a computing unit to be used by the client processor to submit a job, the compute token obtained by the client processor from a server processor coupled to the client processor and distinct from the computing unit, and the determining comprising checking an identifier field of the compute token to determine whether the computing unit is included in the identifier field;
based on determining that the compute token specifies the computing unit, forwarding by the client processor at least a portion of the job to the computing unit to perform analytics processing for the job; and
providing, by the client processor to the server processor, an indication that analytics processing for the job has been requested by the client processor.

12. The computer system of claim 11, wherein the method further comprises notifying the server processor of a request to use a computing unit for analytics processing, based on determining that the compute token does not specify the computing unit.

13. The computer system of claim 12, wherein the method further comprises:
obtaining by the client processor an identification of the computing unit to use, based on the notifying; and
submitting the at least a portion of the job to the computing unit corresponding to the identification.

14. The computer system of claim 11, wherein the providing comprises sending a record request packet to the server processor, the record request packet comprising at least one of an identifier of the job, an identifier of the client processor, a type of the computing unit, an identifier of the computing unit, an estimated completion time for the job, and a progress field.

15. The computer system of claim 11, wherein the method further comprises responding by the server processor to the client processor, based on receiving the indication, wherein the responding comprises sending a record response packet to the client processor, the record response packet comprising at least one of an identifier of the job, an identifier of the client processor, an identifier of the computing unit, and a progress field.

16. The computer system of claim 11, wherein the method further comprises:
determining by the server processor that the client processor has terminated prior to completion of one or more jobs of the client processor;
checking a proxy indicator; and
directing output of the one or more jobs to the server processor, based on determining the client processor has terminated prior to completion and based on the proxy indicator having a first defined value.

17. The computer system of claim 16, wherein the method further comprises performing cleanup on the computing unit of the one or more jobs, based on determining the client processor has terminated prior to completion and based on the proxy indicator having a second defined value.

18. A method of facilitating processing of jobs in a computing environment, said method comprising:
determining, by a client processor, whether a compute token obtained by the client processor specifies a computing unit to be used by the client processor to submit a job, the compute token obtained by the client processor from a server processor coupled to the client processor and distinct from the computing unit, and the determining comprising checking an identifier field of the compute token to determine whether the computing unit is included in the identifier field;
based on determining that the compute token specifies the computing unit, forwarding by the client processor at least a portion of the job to the computing unit to perform analytics processing for the job; and providing, by the client processor to the server processor, an indication that analytics processing for the job has been requested by the client processor.

19. The method of claim 18, further comprising notifying the server processor of a request to use a computing unit for analytics processing, based on determining that the compute token does not specify the computing unit.

20. The method of claim 18, further comprising:
determining by the server processor that the client processor has terminated prior to completion of one or more jobs of the client processor;
checking a proxy indicator; and
directing output of the one or more jobs to the server processor, based on determining the client processor has terminated prior to completion and based on the proxy indicator having a first defined value.

* * * * *